United States Patent
Duté et al.

(10) Patent No.: US 7,028,105 B2
(45) Date of Patent: Apr. 11, 2006

(54) APPARATUS, METHOD AND SIGNAL SET FOR MONOLINE SERIAL INTERFACE

(75) Inventors: John C. Duté, Concord, MI (US); Laurence A. Boyd, II, Brooklyn, MI (US)

(73) Assignee: Electronic Solutions, Inc., Northwood, OH (US)

(*) Notice: Subject to any disclaimer, the term of this patent is extended or adjusted under 35 U.S.C. 154(b) by 439 days.

(21) Appl. No.: 09/916,215

(22) Filed: Jul. 25, 2001

(65) Prior Publication Data

US 2002/0083232 A1    Jun. 27, 2002

Related U.S. Application Data

(60) Provisional application No. 60/220,545, filed on Jul. 25, 2000.

(51) Int. Cl.
*G06F 3/00*     (2006.01)
*H03K 19/0185*  (2006.01)

(52) U.S. Cl. ............... 710/1; 710/100; 710/101; 326/30; 326/56; 711/100; 711/115

(58) Field of Classification Search ............ 710/1, 710/100, 101; 326/30, 56; 711/100, 115
See application file for complete search history.

(56) References Cited

U.S. PATENT DOCUMENTS

| 4,121,183 A | 10/1978 | Murphy |
| 4,275,307 A | 6/1981 | Struger et al. |
| 4,293,924 A | 10/1981 | Struger et al. |
| 4,378,502 A | 3/1983 | Clarke |
| 4,404,473 A | 9/1983 | Fox |
| 4,500,845 A | 2/1985 | Ehni |
| 4,560,936 A | 12/1985 | Pelowski |
| 4,593,380 A | 6/1986 | Kocher et al. |
| 4,697,107 A | 9/1987 | Haines |
| 4,771,403 A | 9/1988 | Maskovyak et al. |
| 4,896,288 A | 1/1990 | Gonnering et al. |
| 4,910,659 A | 3/1990 | Gates et al. |
| 4,914,542 A | 4/1990 | Wagoner |
| 5,079,455 A | 1/1992 | McCafferty et al. |
| 5,111,070 A | 5/1992 | Murphy et al. |
| 5,210,846 A | 5/1993 | Lee |
| 5,233,309 A | 8/1993 | Spitalny et al. |
| 5,361,005 A * | 11/1994 | Slattery et al. ............ 326/56 |
| 5,486,791 A | 1/1996 | Spitalny et al. |
| 5,761,697 A * | 6/1998 | Curry et al. ............ 711/100 |
| 5,790,526 A * | 8/1998 | Kniess et al. ............ 370/257 |
| 5,864,872 A * | 1/1999 | Lee et al. ............ 711/115 |
| 6,088,422 A | 7/2000 | Mann |
| 6,320,494 B1 | 11/2001 | Bartels et al. |
| 6,412,072 B1 * | 6/2002 | Little et al. ............ 713/200 |

* cited by examiner

*Primary Examiner*—Tammara Peyton
(74) *Attorney, Agent, or Firm*—Marshall & Melhorn, LLC

(57) ABSTRACT

Circuit, apparatus, method, and signal set for sending and controlling bi-directional data flow between a microprocessor (or other device) and a peripheral device having a standard UART-based, SPI-based, or similar interface over a single input/output (I/O) port line, utilizing the differences of the instantaneous source impedance of the I/O port line operating with data in and data out states. Circuit, apparatus, method, and signal set for separating the 1-wire data into standard 2-wire and 3-wire UART-based, SPI-based, or similar interfaces for use with unmodified peripheral devices. The exchange of data on a bit-by-bit or analog basis, with insignificant return delay, allows operation independent of any signaling protocol.

46 Claims, 6 Drawing Sheets

Monoline Serial Interface

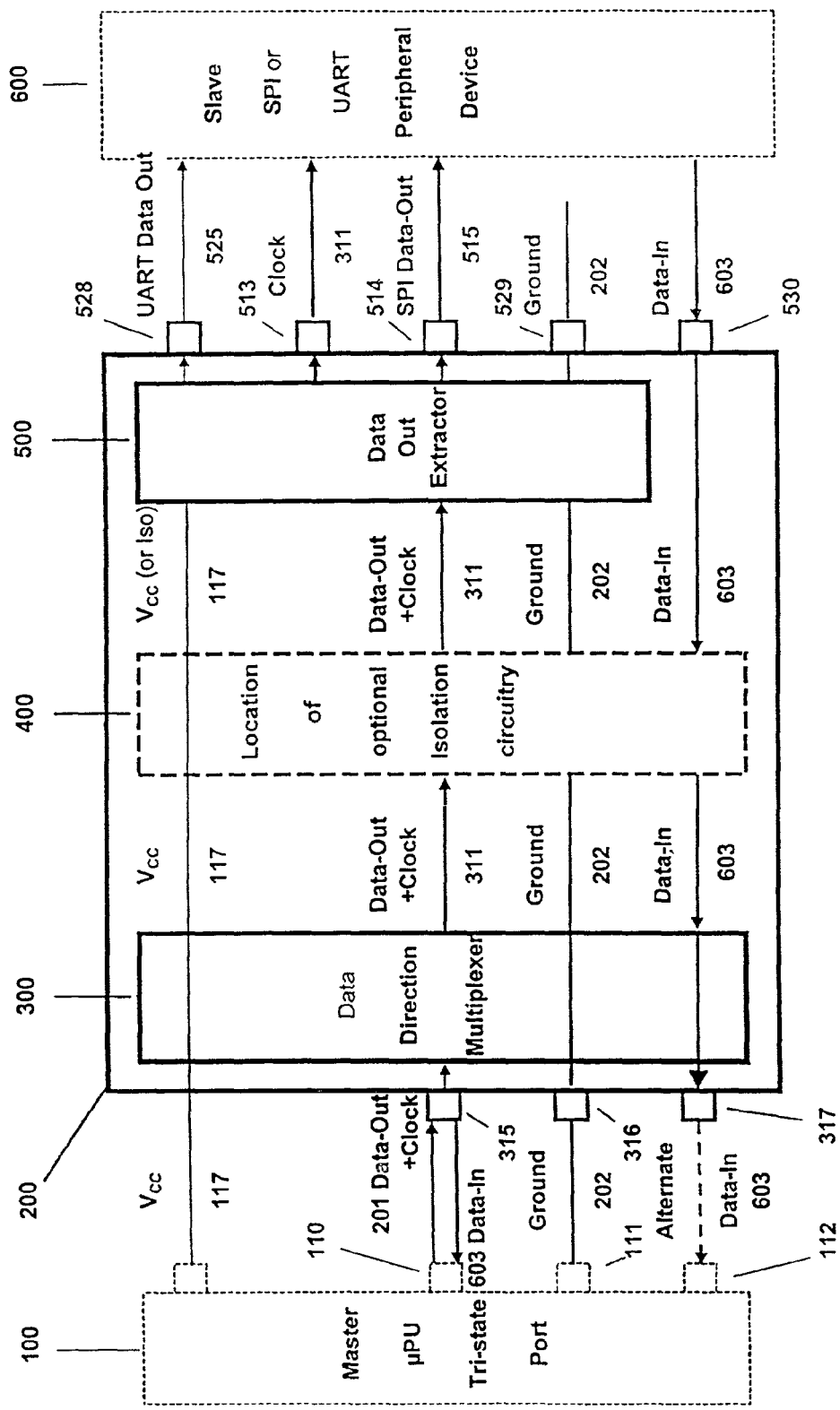
Figure 1 Monoline Serial Interface

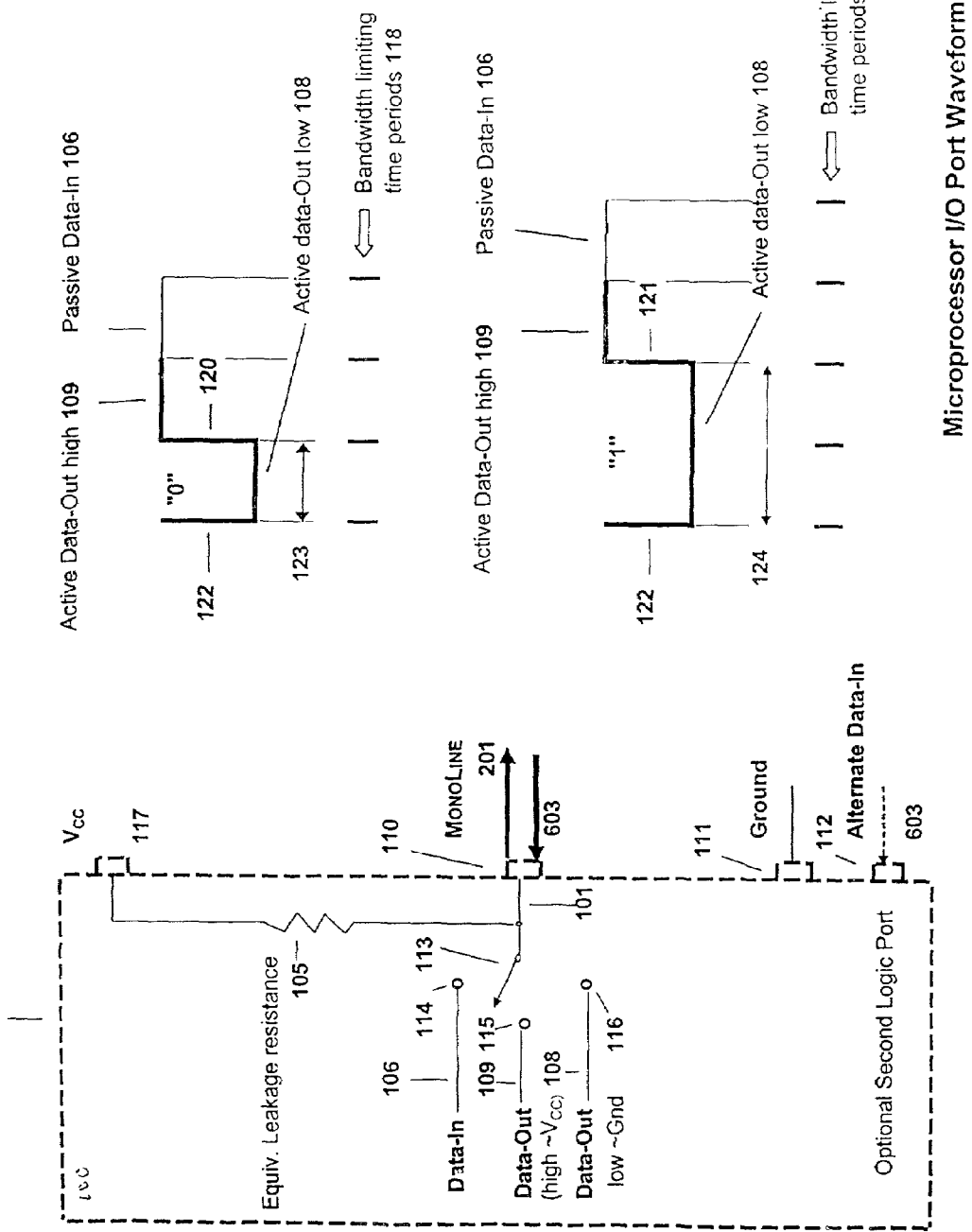

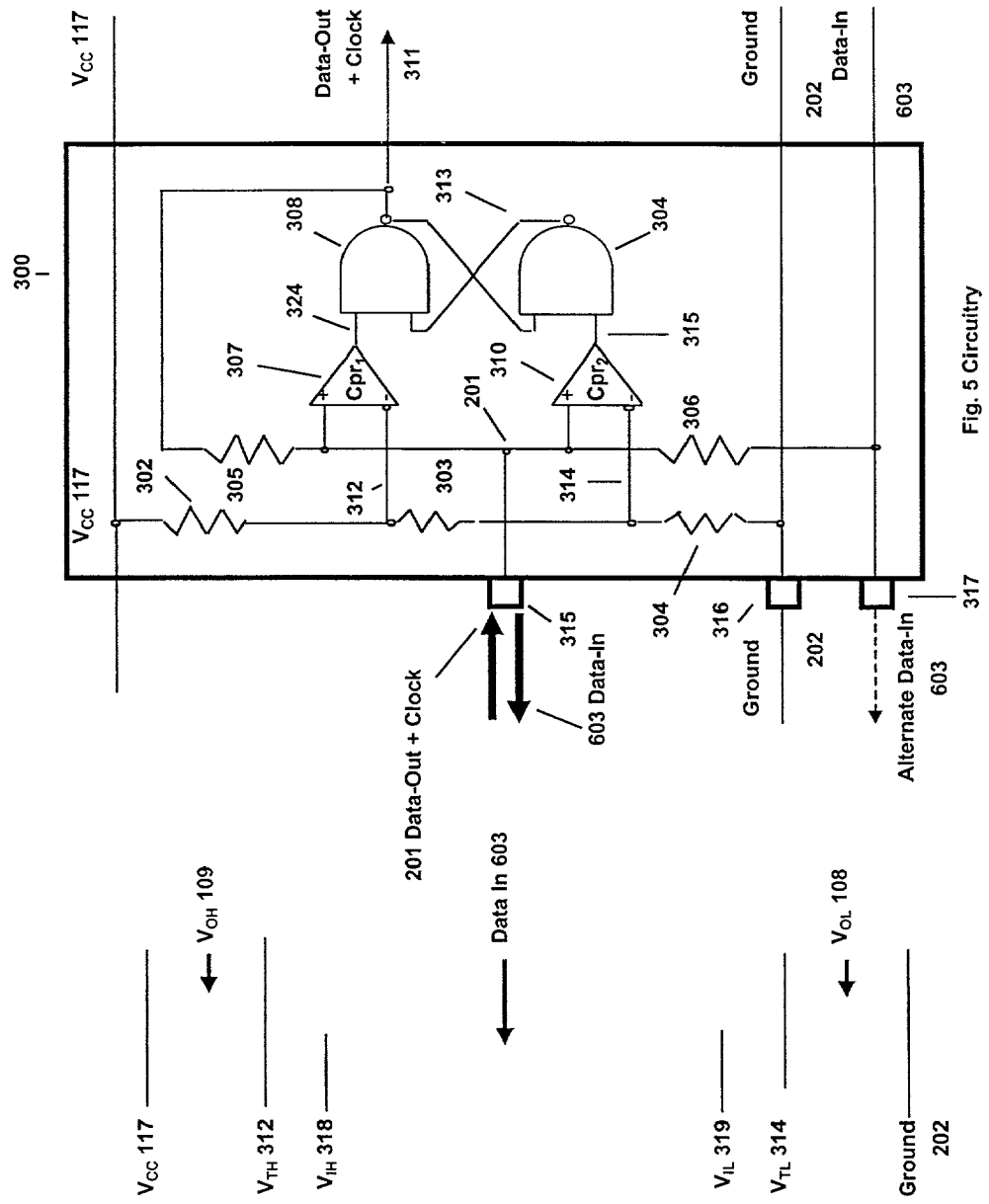

"0" Data-Out bit

"1" Data-Out bit

Data-Out Extractor Circuit

Optional Electrical Isolation

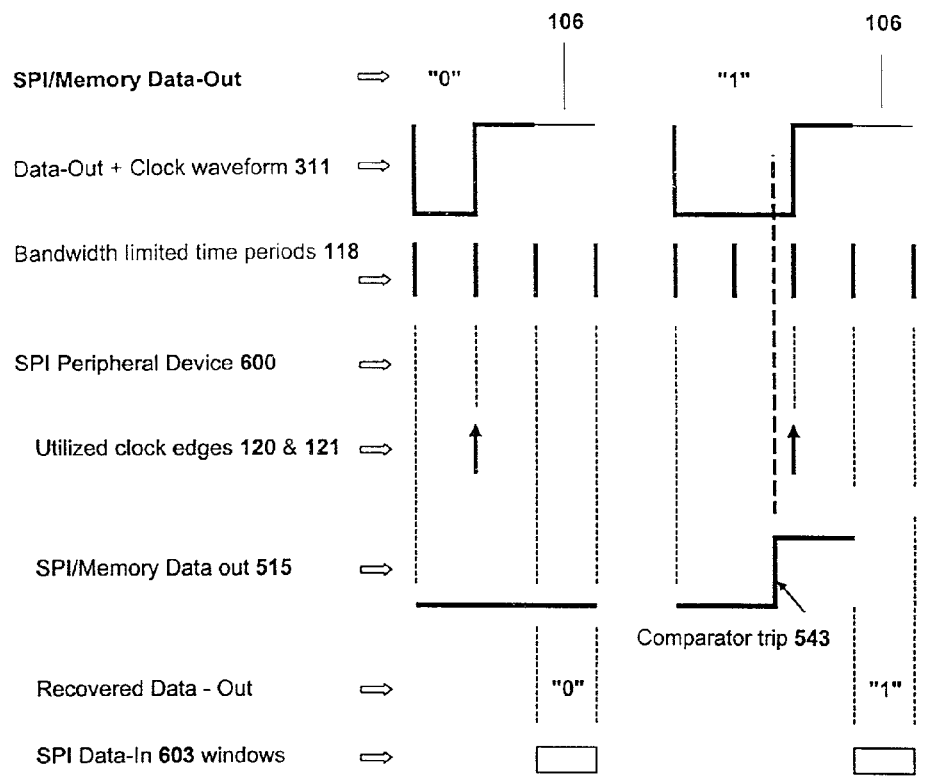
Figure 10 SPI Data
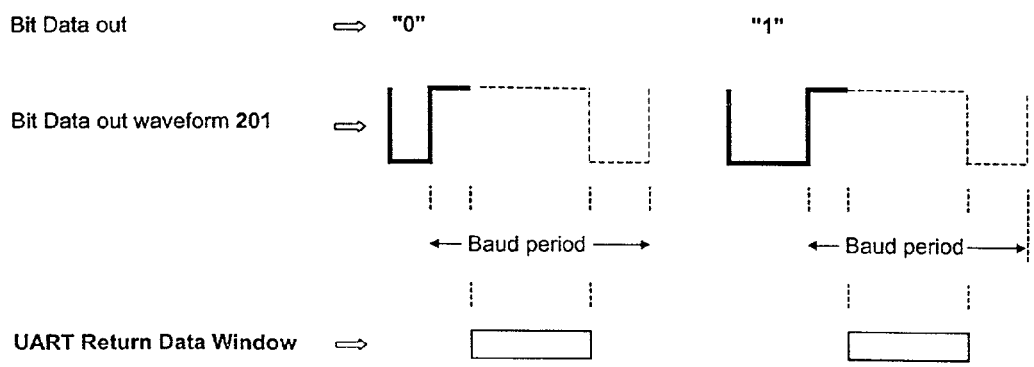
Figure 11 UART Data

APPARATUS, METHOD AND SIGNAL SET FOR MONOLINE SERIAL INTERFACE

RELATED APPLICATIONS

This application is related to an claims the right of priority under 35 U.S.C. 119 and/or 35 U.S.C. 120 to co-pending U.S. Provisional Patent Application Ser. No. 60/220,545 filed Jul. 25, 2000 entitled System, Device, And Method For Comprehensive Input/Output Interface Between Process Or Machine Transducers And Controlling Device Or System; which application is hereby incorporated by reference in its entirety.

FIELD OF INVENTION

This invention pertains generally to an interface circuit, signaling method, and signal for communicating serial input/output data bidirectionally over a single wire or conductor without requiring a signaling protocol to control access to or contention over the single wire or the direction of the data transmission; and more particularly to a circuit, method, and signal for providing a timely bi-directional data or signal flow, without contention, of bit-data over a single conductor between a microprocessor I/O port line and common peripheral devices without the need for signaling protocols.

BACKGROUND OF THE INVENTION

Microprocessor systems often have the requirement of exchanging data between themselves and a variety of peripheral or other devices such as memories or control equipment or even another microprocessor.

Serial communications between these microprocessor systems and peripheral or other devices is the means of choice unless very high-speed operation is required because serial communications does not require the multiplicity of data and address lines used by parallel communications.

The telegraph is the oldest digital communications means that exchanged binary data bits (some long and some short) over a bidirectional circuit using what is now known as half-duplex communications.

In order for a half-duplex circuit to minimize potential of conflicts over the direction of traffic, a set of rules, or communications protocol, was required for the operators. Protocols require the transmitter to send some kind of message that the receiver acknowledges. In the case of the telegraph the protocol was implemented by people, today this is implemented by smart hardware. In general, protocol or hand-shake messages are overhead and do not contribute data information to the communications process, but are a necessary evil.

Signaling protocols are common in the communication and computer arts. For example, a signaling protocol is required for the operation of the half-duplex one-wire-bus system in Curry U.S. Pat. No. 5,045,675. In contrast Duté in U.S. Pat. No. 5,729,547 eliminated the need for a signaling protocol in half-duplex single circuit links by utilizing current sensing hardware. U.S. Pat. No. 5,045,675 describes operation over a one-wire bus, but operation is contingent on the separation of receive and transmit signals over the single wire which is controlled by the timing and signaling protocol located in the peripheral device. In the system and method described in U.S. Pat. No. 5,729,547 operation is also described over a one-wire bus, but in this implementation a combination of a half-duplex protocol and line current monitoring prevents bi-directional traffic contention.

Typical state-of-the-art serial communications systems and methods, use two or three wire systems and methodologies. Asynchronous UARTs (universal asynchronous receiver transmitter) for example, require 2 wires, one each for "data-out" and "data-in". Synchronous systems, such as for example, the SPI (Serial Peripheral Interface), require three wires "data-out," "data-in," and a clock. UART devices typically require two wires, lines, or conductors. Serial Peripheral Interface (SPI), advanced by Motorola, is a synchronous serial data protocol that provides support for a high bandwidth network connection among CPUs and other devices supporting SPI, as well as other applications. Devices may broadly be chosen and include devices made by a multitude of manufacturers. Such devices include but are not limited to remote clocks, memory, temperature, digital potentiometers, digital audio, security chips, serial numbers, as well as other devices.

Circuit packaging, system requirements, and costs often limit the availability of device input/output (I/O) lines, and these I/O line limitations are particularly problematic with controller, microcontroller, processor, and microprocessor packages.

Therefore there remains a need for apparatus, system, and method that reduce the number of lines, wires, conductive traces, or other conductors to a minimum (preferable to a single conductive line) and that either provides a simplified signaling protocol or entirely eliminates such signaling protocol.

SUMMARY

Circuit, apparatus, method, and signal set for sending and controlling bi-directional data flow between a microprocessor (or other device) and a peripheral device having a standard UART-based, SPI-based, or similar interface over a single input/output (I/O) port line, utilizing the differences of the instantaneous source impedance of the I/O port line operating with data in and data out states. Circuit, apparatus, method, and signal set for separating the 1-wire data into standard 2-wire and 3-wire UART-based, SPI-based, or similar interfaces for use with unmodified peripheral devices. The exchange of data on a bit-by-bit or analog basis, with insignificant return delay, allows operation independent of any signaling protocol.

Embodiments of the invention provides for circuit and method for the transmitting of data and clock to a peripheral device as well as receiving data from the same device over a single microprocessor I/O line.

BRIEF DESCRIPTION OF DRAWINGS

The present invention will be described with reference to the accompanying figures which show exemplary embodiments of the invention for purposes of explanation and description and which are incorporated in the specification hereof by reference, wherein:

FIG. 1 is a diagrammatic illustration showing an embodiment of a single- or mono-line serial interface including primary elements of the MonoLine serial interface as connected between a microprocessor and a conventional external Peripheral Device.

FIG. 2 is a diagrammatic illustration showing an embodiment of an exemplary equivalent circuit of a typical microprocessor I/O port line.

FIG. 3 is a diagrammatic illustration showing examples of microprocessor generated I/O line waveforms.

FIG. 4 is a diagrammatic illustration showing the signal levels of various signal that arise in conjunction with operation of embodiments of the invention.

FIG. 5 is a diagrammatic illustration showing an embodiment of the data direction multiplexer block or circuit according to the invention.

FIG. 10 is a diagrammatic illustration showing an exemplary Serial Peripheral Interface (SPI) based or similar peripheral device data.

FIG. 11 is a diagrammatic illustration showing an exemplary UART peripheral device data.

DETAILED DESCRIPTION OF SELECTED EMBODIMENTS

Figure 6:
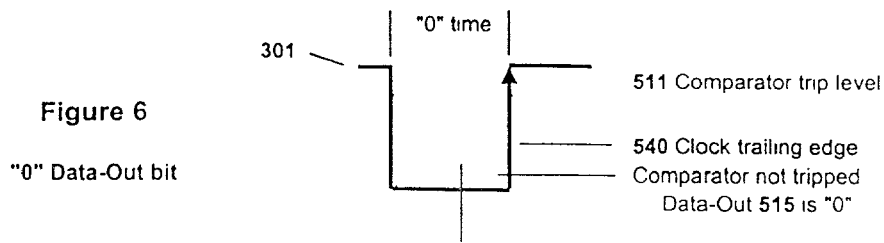
FIG. 6 is a diagrammatic illustration showing an exemplary "0" Data-Out bit waveform as used in conjunction with the Data-Out Clock Separator extractor circuit in FIG. 8.

Aspects, features, and embodiments of the invention are now described relative to the drawings.

FIG. 1 is a diagrammatic illustration showing the flow of bidirectional Data-Out and Data-In signals over a single conductor or line 201 from microprocessor 100 I/O Port 110 through an embodiment of the MonoLine Serial Interface 200 to serial Peripheral Device 600. Note that microprocessor 100 (or other device or circuit) and peripheral device 600 may be of any conventional (or non-conventional design) and do not necessarily form a part of the invention, except that in the case hardware performing the described function is integrated or otherwise combined with a device or other circuit, such as with either the microprocessor or peripheral device, then they may form part of the invention.

The exemplary embodiment of the Monoline serial interface illustrated in FIG. 1 includes the following elements: (i) means at the master end (for the microprocessor or special hardware) 100 to sequence a single I/O line port 110 through a plurality of states; and (ii) means at the slave or peripheral device end of the single I/O line, including a data direction multiplexer block or circuit 300, with means to respond to the active and passive states of the master allowing time alternate bidirectional transfer of information on a time-shared basis.

In one embodiment, the means 100 at the master end (for coupling with the microprocessor or other special hardware) to sequence a single I/O line port 110 through a plurality of states provides for sequencing the single I/O line port 110 through the following states. A first or low impedance output high, an active state, for transmitting data. This output low state is held for a variable length of time dependent upon the output data being either a logical "1" or "0" (for binary digital data) or a plurality of values for multi-state or analog data. A second state during which it returns to output high, generating a edge which may be used as a clock by the slave peripheral device 600 (when a clock is required for operation). A third or high impedance input state and passive state for receiving data. This state will be held until ready to transmit the next bit of output data. A fourth or sample the input data state, interpreting its level as digital or analog values. This data is from an intermediate impedance signal at the slave end. The means or manner for providing this set or sequence of states may, for example, be via a software driver using a standard microprocessor I/O port as is known in the art, or by specific hardware which transfers data to and from registers containing one or a plurality of bits, or by other means as are known in the art.

It may be appreciated by workers having ordinary skill in the art that low impedance is usually a value in the low hundreds of ohms or less and that high impedance is a higher value. In this particular embodiment of the invention, the important distinction is that there is a ratio of the read, or passive, high impedance to the write or active, low impedance. The practical ratio we are using is an impedance ration of about 1000:1. Smaller impedance ratios would work and may be used, but in such cases the margins are reduced which makes noise potentially a greater concern or hazard. Higher impedance ratios may also be used.

At the slave or peripheral device end of the single I/O line, the interface includes a Data Direction Multiplexer 300, with a means to respond to the active and passive states of the master as described above and as illustrated at port terminal 315 from signal 201 allowing time alternate bi-directional transfer of information on a time-shared or time sequential basis. It further includes means, such as for example a circuit, for providing a continuing path the data out+clock 311 whose edge will subsequently be used as a clock 311, and data in 603 for use by other downstream slave functions. The active output 201 seen at port terminal 315 is latched such that data-out and clock signal 311 is maintained at the last master active output state, during the masters passive input state.

For Data-In 603 to be returned to the master via 201, the Data Direction Multiplexer should transform this signal to meet two requirements. First, it should be presented to port terminal 201 with an impedance such that the slave appears passive to an active master output, but active to a passive master input. Second, the data-in information should be presented to port terminal 201 in such a way that it does not change the value latched for Data-out+clock signal 311. The Data Direction Multiplexer 300 achieves this by providing logic ahead of the latch such that the latch changes state only within two narrow signal ranges, one near Vcc 117 and the other near Ground (or other reference voltage) 202. Signal levels between these two ranges, which represent valid high or low values to other logic, or valid analog levels, are in what may conveniently be referred to as a dead band as seen by the latch and do not affect it. By modifying the values of data-in 603, when different from latched data, to fall within this dead band, they can be presented to port terminal 201 such that they are correctly seen by the master, but do not change the latch. Optionally the data-in 603 information can also be provided separately via an alternate data-in port terminal 317.

The data-out extractor block or circuit 500 extracts the data information from the data-out+clock signal 311 and passes it to the peripheral device 600. When SPI hardware is used by the peripheral device 600, the circuit should be configured to clock data-in & out on the clock trailing edge. When so configured, the data-in signal need only be in its correct state for a short period of time before and after the trailing clock edge.

It is noted that for peripheral devices that do not require a clock, circuitry elements used to recover the clock are optional and may be eliminated. Those peripheral devices requiring a clock, such as SPI, are provided with such clock information or signal by means for recovering clock information from received PWM pulses by using edges of the pulse.

When the peripheral device 600 interface is or includes a UART, the data-out signal is sampled multiple times during one bit time, and so must remain in its correct state over this entire time so that the sampling with accurately identify its value over that time. To facilitate this, the data-out extractor circuit 500 provides a latch to maintain the data. The latched value is available as UART Data-out signal 525. Return data from either a UART or SPI interface uses Data-In 603.

Optionally, isolation circuitry 400, may be provided and when so provided is desirably placed between the data direction multiplexer 300 and the Data-Out Extractor 500. Other isolation circuit topologies relative to the multiplexer and the extractor may alternatively be utilized. The isolation circuit, electrically isolates Data-Out+clock 311, Data-In 603, $V_{CC}$ 117 and Ground 202 signals. By so doing the Peripheral Device 600 is completely isolated form the microprocessor 100.

FIG. 2 is a diagrammatic illustration showing an embodiment of a logic equivalent of the three states available with standard microprocessor tri-state I/O ports, represented for simplicity as three positions of switch 113. Switch or logic position 114 state 106 is a high impedance, passive input state for receiving data. Switch or logic position 115 state 107 is a low impedance, active output high state for transmitting data. Switch or logic position 116 state 108 is a low impedance, active output low state for transmitting data. Those workers having ordinary skill in the art will appreciate that there are a variety of software, firmware, and/or hardware circuit ways of implementing the switch or logic to achieve these states and the described transitions between states. These three states are reflected by in Data-Out+Clock 210 and Data-In 603 through bi-directional pin 110 of the microprocessor 100. The large difference in impedance between the input state and the two output states allow the Data Direction Multiplexer 300, at the other end of Monoline conductor or wire 201, to present return data at an impedance, such that the Data Direction Multiplexer 300 appears passive when the equivalent switch 113 is either of its active output states 107 or 108, and appears active when switch 113 is in its passive input state 106.

With reference to FIG. 3, there are illustrated several exemplary active Data-Out and passive Data-In waveforms that are generated or received by microprocessor software (or other software or hardware), including active data-out high, active data-out low, and passive date-in waveforms or waveform levels for "0" and "1" logic state data.

In order for the Direction Multiplexer 300 to detect a "1" (high or first logic stage) or "0" (low or second logic stage) data pulse, the microprocessor first generates a high to low transition 122 that signifies the beginning of a data pulse when its Data-Out signal+Clock signal 101 becomes active Data-Out low state 108.

The time duration of the active data-out low signal bit period 123 for a "0" should be the minimum time period 118 based on the system bandwidth. A longer time period, nominally a minimum of two time periods 118 or a period 124 that is twice as long as period 123 are required for a "1". The system bandwidth determines the minimum time periods for "0" and "1" signals because it limits the shortest period of time that can be resolved. For example, assuming the system bandwidth is 1 MHz, then the minimum "0" or active data-out low signal bit period 123 would be about 1 microsecond.

At the completion of either a "0" or "1" period, the microprocessor causes the line 101 to transition to an active Data-Out high state 109 for one time period 118. The transition to a high-state for a "0" state signal produces a clock edge 120, the transition to a high-state for a "1" produces clock edge 121.

The microprocessor then changes the Data-In state 106 to allow the microprocessor to read the Data-In. In some embodiments of the invention, operation of the microprocessor to achieve the aforedescribed operation is controlled by computer program code or software executing within the microprocessor as is known in the art.

With reference to FIG. 5, attention is now directed to the structure and operation of an embodiment of Data Direction Multiplexer 300. The primary function of the Data Direction Multiplexer 300 is to allow both Data-Out and Data-In traffic over the single conductor MonoLine 201, and to prevent the Data-Out+Clock signal 311 from changing while the microprocessor I/O port is in the data-in state.

Resistors 302, 303 and 304 form a voltage divider between supply voltage $V_{CC}$ 117 and ground 202, and thereby producing high threshold voltage $V_{TH}$ 312 and low threshold voltage $V_{TL}$ 314 for use by comparator (Cpr1) 307 and comparator (Cpr2) 310 respectively.

In order to provide a wide voltage range during Data-In mode, these reference voltages are advantageously selected to be greater than an expected worst case input high logic voltage $V_{IH}$ 318 and less than an expected worst case input low logic voltage $V_{IL}$ 319. The relationships between $V_{CC}$ 117, $V_{TH}$ 312, $V_{IH}$ 318, $V_{IL}$ 319, $V_{TL}$ 314, and ground are illustrated in FIG. 4.

As a result of the low output source impedance and small current load of the active Data-Out high state, the data-out high state signal ($V_{OH}$) 109 will be greater than high threshold voltage $V_{TH}$ 312, and Data-Out low state signal ($V_{OL}$) 108 will be less than low threshold voltage $V_{TL}$ 314, respectively during data out states 108 and 109.

The output 324 of comparator 307 changes from high ("1") to low ("0") when the voltage of input Data-Out+Clock 101 is greater than voltage $V_{TH}$ 312, thus causing the output 311 of flip-flop connected NAND gate 308 to go high ("1") and remain so.

In an analogous manner, the output 315 of comparator 310 changes from high ("1") to low ("0") when the voltage of input Data-Out+Clock 101 is less than voltage $V_{TL}$ 314 thus causing the output 311 of flip-flop connected NAND gate 308 to go low ("0") and remain so.

It is to be noted that the Data-Out+Clock signal 311 output by Data Direction Multiplexer 300 is a delayed replica of the Data-Out signal 201 input to the Data Direction Multiplexer 300 and presented to the comparators 307 and 310 and will remain in the same state as the most recent active high 109 or active low 108 state Data-Out voltage 201.

During Data-In selection, the magnitude of voltage 201 is determined by the voltage divider, in this embodiment, consisting of resistors 305 and 306, as energized by the difference in voltage 311 from the output of the flip-flop NAND gate 308 and the Data-In line 603, thus remaining between $V_{TH}$ 312 and $V_{TL}$ 314.

The ratio of resistors 305 and 306 are such as to meet the condition that the ratio of the voltage across resistor 303 with respect to the voltage across resistors 303 and 305

(voltage divider) should be between $V_{IL}/V_{CC}$ and $V_{TL}/V_{CC}$, or more analytically, should generally meet the requirements of the following inequality:

$$(V_{IL}/V_{CC})>(V_{R303}/V_{R303+R305})>(V_{TL}/V_{CC}).$$

Desirably, a further restriction is placed on the values of resistors 305 and 306, such that the sum of their resistance should be much larger than (nominally 10 times) the magnitude of the equivalent leakage resistance 105 in order to minimize loading when the outputs are active high or active low.

In an alternate embodiment, resistor 305 is connected directly to $V_{CC}$ 117 instead of to the output of NAND gate 311. This configuration can prevent Data-Out 311 from being modified by changes in Data-In 603, but with reduced margins between $V_{TH}$ 312 and $V_{IH}$ 318 and between $V_{TL}$ 314 and $V_{IL}$ 319.

Figure 7:
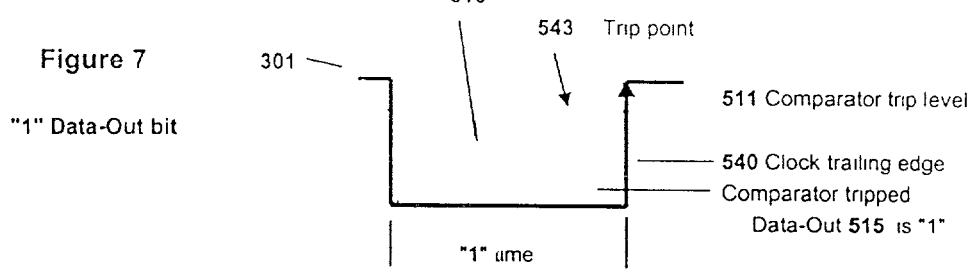
FIG. 7 is a diagrammatic illustration showing an exemplary "1" Data-Out bit waveform as used in conjunction with the Data-Out Clock Separator extractor circuit in FIG. 8.
Figure 8:
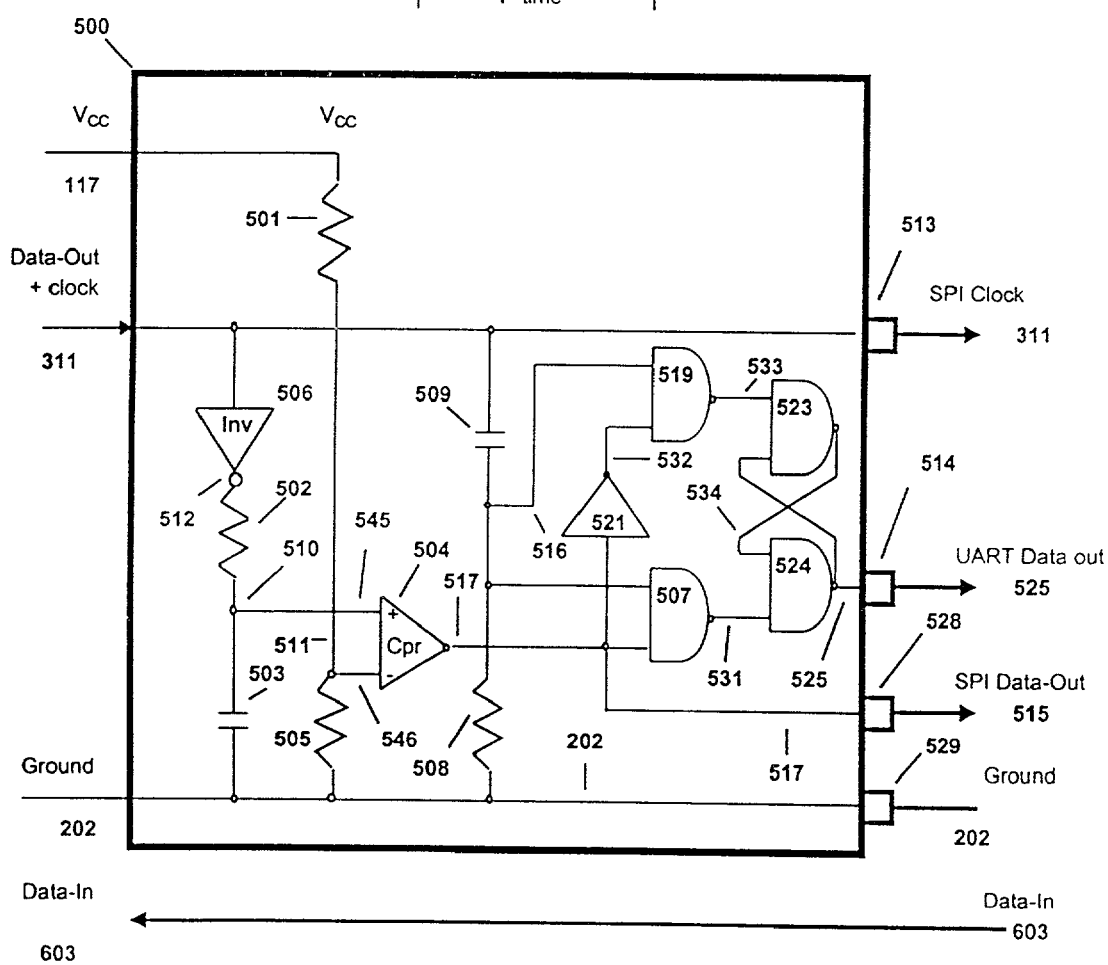
FIG. 8 is a diagrammatic illustration showing an electrical schematic of an embodiment of the Data-Out—Clock Separator block or circuit according to an embodiment of the invention.

With reference to FIG. 6, FIG. 7, and FIG. 8, attention is now directed to a description of the structure and operation of Data-Out Extractor 500. FIG. 6 and FIG. 7 are individual representations of "0" and "1" signals that make up the Data-Out+Clock signal 311 which is the input to Data-Out Extractor 500 of FIG. 8 The peripheral device 600, such as the SPI Peripheral Devices 600 used for purposes of explanation here, uses the trailing edge 540 of either the "0" or "1" signal, shown by the vertical arrows of both FIG. 6 and 7, as its clock 301 to strobe in the instantaneous value of its Data-Out signal 515. The beginning state of both "0s" and "1s", as shown in FIG. 6 and FIG. 7 is high ("1"), causing the output 512 of Inverter 506 to go low ("0") resulting in the discharge of capacitor 503 to a low voltage value 510. As long as the capacitor voltage 510 that is applied to the positive or non-inverting input 545 of comparator 504 is less than the reference voltage 511 applied to the comparator inverting input 546, the output 517 of Comparator 504 will remain low.

As the Data-Out+Clock signal 301 continues in time, it changes from its beginning high to a low state. This low state causes the output 512 of Inverter 506 to become high and charges capacitor 503 through resistor 502. Thus while Data-Out+Clock 301 is low the charge in capacitor 503 as reflected in voltage 510, will start a 0 and increase with time.

The charging time-constant of the resistor 502 and capacitor 503 combination is selected to prevent voltage 510 from reaching the trip level 511 of Comparator 506 during a "0" time period. When a "0" clock edge 540 of FIG. 6 occur, SPI Data-Out 515 to the Peripheral Device 600 a "0" can be clocked in. In a like manner, the time period for a "1" is long enough to ensure that the Comparator 504 trip level 511 is reached before the clock edge 540 FIG. 7 occurs and a "1" is clocked in.

In order to hold the most recent "bit" value for use by Asynchronous type Peripheral Devices, the Comparator 504 output 517 is applied as input to NAND gate 507 and its inverted state, via Inverter 521, is applied to the input of NAND gate 519. While the Data-Out+Clock signal 301 is low, the pull-down resistor 508 holds the second input of NAND gates 519 and 507 low keeping their respective outputs 533 and 531 high. As the Data-Out+Clock signal 301 (or 401) goes high at the end of a bit period, voltage 516 is also pulled high for a period, controlled by the time constant of resistor 508 and capacitor 506, briefly enabling NAND gates 519 and 507, thus enabling the flip-flop made up of NAND gates 523 and 524 to latch the state of 517 as follows: (A) if voltage 517 is high, the output of NAND gate 507 becomes low thus setting the flip-flop made up of NAND gates 523 and 524 such that output 525 latches high representing a "1" Data-Out 525 for UART; and (B) in a similar manner, if signal 517 is low, the output of NAND gate 519 becomes low causing the flip-flop output 525 latches low, representing a "0" for UART Data-Out 525.

Figure 9:
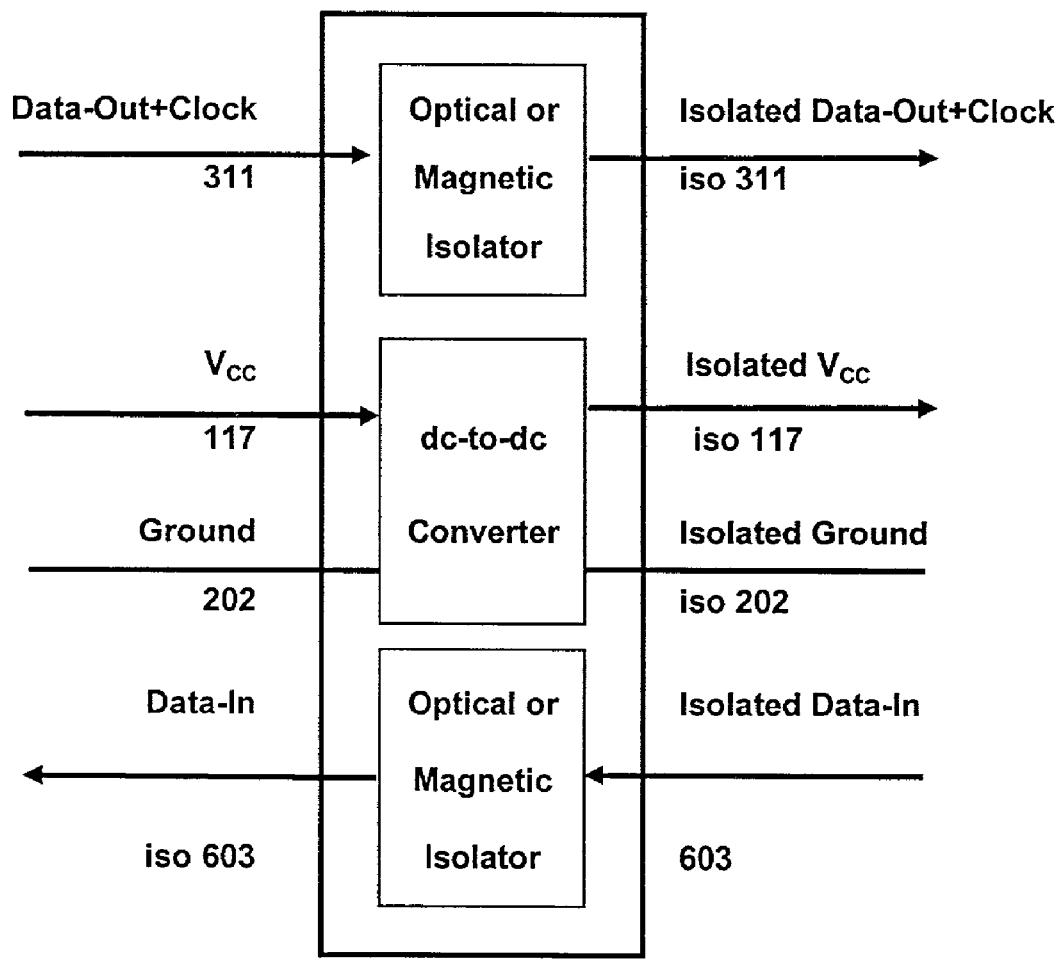
FIG. 9 is a diagrammatic illustration showing an embodiment of a optional isolation circuit that may be used with the inventive serial interface circuit.

Isolation circuitry 400 for electrically isolating high voltage inputs and outputs from the low voltage logic levels signals of the host may optionally but advantageously be provided between Data Direction Multiplexer 300 and Data-Out extractor 500. An embodiment of isolation circuitry 400 is show in FIG. 9 and described in greater detail hereinbelow and in co-pending U.S. patent application Ser. No. 09/915,188 filed Jul. 25, 2001 entitled System, Device, And Method For Comprehensive Input/Output Interface Between Process Or Machine Transducers And Controlling Device Or System. In the illustrated embodiment, Data-Out+Clock 311 passes through an optical, magnetic, or other isolator generating an isolated DataOut+clock signal at its output. In analogous manner, a data-in signal on the peripheral device side of the interface passes through an optical or magnetic isolator to generate an isolated data-in signal to the microprocessor (or other device). A dc-to-dc isolator to isolate supply voltage Vcc as well as ground may advantageously be provided. These three isolation circuits may separately be provided, but all are advantageously provided in at least some embodiments of the invention. It is noted that the signal on either the input side or the output side may be referred to as the isolated signal as the signal on either side of the isolator 400 is isolated from the other.

With respect to FIG. 10, attention is now directed to characteristics of SPI data. Bit stream 201 is representative of Data-Out+Clock from I/O Port 110. This signal is reproduced by the Data Direction Multiplexer 300 as 311 for presentation to the Data-Out Extractor 500. The minimum time between changes in state for this signal is limited by the bandwidth of the associated hardware and software. Using one such time period for the low portion of a "0", the low portion of a "1" must be at least 2 or more periods in duration. The SPI data out 515 must reflect its "0" or "1" at the time of the trailing clock edge 540, to be correctly read by the peripheral device 600.

One period after the trailing edge, the I/O port 110 may be switched to the data in state 106, providing a window for reading data-in 603. Because of the previously described action of the Data Direction Multiplexer 300, this window cannot change the state of 311.

A standard SPI interface, as well as other derivative or different interfaces, configured for data transfer on the trailing edge of its clock input, may use the signal SPI Data-Out 515 as its data input and Data-Out & Clock 311 as its clock.

It is to be noted that the read period 106 that occurs at the end of "1" waveforms could actually be made to occur during the second half of the "1" active period, followed by an active high, thus causing the flop of Data Direction Multiplexer to change state causing a clock edge. The benefit of this approach is to reduce the total time for sending and receiving data.

With respect to FIG. 11, attention is now directed to characteristics of UART data. UART data is transmitted as a series of bits, each of which is one baud period in duration. A fixed number of bits constitute a character. The time between characters is variable. Data for UART data Out 525 is latched by the flip-flop made up of NAND gates 523 and 524 and clocked on trailing edge 540.

For UART data in 603, each character has the same bit timing as for data out, but is derived from an independent clock in the peripheral device 600.

UART hardware typically samples at a rate of 16 times per baud period. At the master 100 if the output states 108 and 109 occur only between samples of the data-in 603, without altering the sample rate, the data-in 603 will always be present at each sample time, providing for continuous bidirectional flow of data. This provides full duplex data flow over a single line. Of course, other alternative UART sampling rates may be used in which case the period, window, and error characteristics may differ.

It will be observed that the single or monoline aspect of the invention does nor require a signaling protocol that consumes overhead and that the need for a signaling protocol is eliminated in half-duplex circuits by utilizing the difference in-between transmit and receive status impedance. In addition to having no need for a signaling protocol, this invention also makes it possible for both SPI and UART devices as well as other devices to operate, on a bit-by-bit basis, bidirectional over a single microprocessor port I/O line.

Having described structural and operational characteristics of certain embodiments of the inventive serial interface circuit, it will be apparent to those workers having ordinary skill in the art in light of the description provided here that different circuit configurations, such as different comparator and logic circuits or different voltage divider circuits may be used in the data direction multiplexer 300, or that different circuitry or logic circuits may be used in the data-out extractor circuit 500, without departing from the scope of the invention. This method has been described in connection with operation of the various circuit embodiments above, but as there are many different circuits that may implement the method and the methodology is independent of any particular circuit embodiment.

The embodiment previously described may also transfer Analog data to and from the peripheral device 600, using Pulse Width Modulation where the time duration, or width, of a pulse is proportional to an analog value, when said peripheral device 600 is connected to UART data out 525 and data-in 603.

UART data out 525, as embodied in FIG. 8, is the output of the latch composed of NAND gates 523 and 524. To cause the output a pulse on UART data out 525, the master 100 need send only the leading and trailing edges of such a pulse, sending a digital "1" followed by a digital "0", with variable separation between the two, thus setting the state of the previously mentioned latch.

During the time not used in sending the "1" and "0", data-in 603 is available to the master 100. By sampling data-in 603 at regular intervals, the master 100 can measure the time duration of pulses representing returned analog values. If the sending of the "1" and "0", via data-out+clock 201, is scheduled to occur between samples, without altering the sample rate, the data-in 603 will always be present at each sample time, providing for continuous bidirectional flow of data. This provides full duplex analog data flow of over a single line.

Optionally, signal conditioning circuitry, using existing technology and not a part of this invention, could be used to transform Pulse Width Modulation to and from other forms of representing analog data.

While peripheral devices have been described somewhat generally, it will be appreciated that memory circuits and memory chips are one primary example of a device that may be operated with the benefit of the inventive interface do to the frequent and close association between microprocessors and memory.

In another aspect, the inventive interface circuit may be integrated with the peripheral device to provide the described functionality. Also or alternatively, hardware may be included with the microprocessor for generating the sequence of states needed to utilize the Monoline.

It will be appreciate in light of the description provided herein that the inventive structure and method provide significant advantages over conventional structures and methods. For example, the monoline, over a single microprocessor I/O line, makes possible the transmitting of data and clock to a peripheral device as well as receiving data from the same device by the unique combination of features, including one or more of: (I) Pulse Width Modulation (PWM), where pulses of different or varying duration are used to represent (e.g. "1" and "0") and transmit data (usually digital, but alternatively analog) from an I/O port (the I/O port could be part of hardware with a tri-state port and without a microprocessor, particularly for transmitting audio analog information) to the peripheral or other device. (II) For those peripheral devices requiring a clock, such as SPI, provide a means for recovering clock information or signal from the received PWM pulses by using edges of the pulse. (III) Provide a time window, following the transmission of PWM data to the peripheral from a low source impedance, active high or low, by changing to passive high impedance for receiving digital or analog data from the peripheral (or other) device. (IV) Provide a means that prevents the peripheral device from receiving the data that it is transmitting to the host. (V) The separation of data-out+ clock and data-in at the peripheral device such that it can interface to a standard SPI or SPI-based devices. (VI) The separation of data-out and data-in at the peripheral device such that it can interface to a standard UART at the peripheral device. (VII) The separation of data out and data in, at the peripheral device, such that it can interface to devices which use Pulse Width Modulation to convey analog values.

It will further be appreciated that the invention provides circuit, structure, signal set, and method that facilitate inter device communications. Among the numerous advantageous advantageous features provided by the invention, several are highlighted immediately below.

In one aspect, the invention provides circuit, method, and means for controlling the direction of data traffic, between a host microprocessor and a remote peripheral device, over a single I/O line by utilizing the differences of instantaneous source impedance of a controlling micro-processor I/O line during data out and data in modes.

In another aspect, the invention provides circuit, method, and means for the bidirectional exchange of data over a single microprocessor I/O line on a bit-by-bit basis independent of any signaling protocol.

In another aspect, the invention provides circuit, method, and means for the bidirectional exchange of data over a half-duplex communications line that requires no signaling protocol.

In another aspect, the invention provides circuit, method, and means for controlling the direction of data transmission over a single conductor without the need of timing commands.

In another aspect, the invention provides circuit, method, and means for controlling the direction of data transmission over a single conductor without the need of timing circuits.

In another aspect, the invention provides circuit, method, and means for implementing the full bi-directional capabilities of a normally three-wire SPI bus serial system between a single microprocessor I/O line and standard SPI hardware or software equivalents.

In yet another aspect, the invention provides circuit, method, and means for implementing the full bi-directional capabilities of a normally two-wire UART bus serial system between a single microprocessor I/O line and standard UART hardware or software equivalents.

In still another aspect, the invention provides circuit, method, and means for implementing the full bi-directional capabilities of a multi-wire serial memories over a single microprocessor I/O line.

In another aspect, the invention provides circuit, method, and means for providing full bidirectional data flow over a single line under complete control of a host microprocessor and requiring no modification of remote SPI or UART peripheral devices.

It will also be appreciated that while aspects of the invention have primarily been described with reference to digital communication or data, that aspects of the invention also pertain and may be utilized with analog signals in analog systems and devices as well as in digital/analog hybrid systems and devices. For example, the provision of dedicated hardware at the host end (for example, to get around the speed limitations of microprocessors), it facilitate the interface and communication of audio and/or video signals in either digital or analog form. Those workers having ordinary skill in the art in light of the description provided herein will appreciate many other applications of the interface circuit and method.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. All publications and patent applications cited in this specification are herein incorporated by reference as if each individual publication or patent application were specifically and individually indicated to be incorporated by reference.

We claim:

1. A circuit for controlling the direction of data traffic, between a first device and a second device, over only a single I/O line by utilizing the differences of instantaneous source impedance of the controlling I/O line during data out and data in modes.

2. The circuit in claim 1, wherein said controlling the direction of data traffic includes the controlling of input and output data communication.

3. The circuit in claim 2, wherein said controlling of input and output data communication is without the presence of any additional signaling protocol that identifies a data input phase or a data output phase.

4. The apparatus in claim 2, wherein said controlling of input and output data communication is conducted without any non-data bit overhead.

5. The apparatus in claim 1, wherein maid instantaneous source impedance is changed between a low impedance and a high impedance.

6. The apparatus in claim 5, wherein a ratio of said high impedance to said low impedance is about 1000:1.

7. The apparatus in claim 5, wherein a ratio of said high impedance to said low impedance is at least about 1000:1.

8. The apparatus in claim 5, wherein a ratio of said high impedance to said low impedance is between at least about 100:1.

9. The apparatus in claim 5, wherein a ratio of said high impedance to said low impedance is between at least about 100:1 and about 10000:1.

10. The apparatus in claim 1, wherein said first device comprises a microprocessor and said second device comprises a peripheral device.

11. The apparatus in claim 10, wherein said controlling I/O line comprises a controlling microprocessor I/O line.

12. The apparatus in claim 10, wherein said peripheral device comprises a memory.

13. The apparatus in claim 10, wherein said peripheral device is a device selected from the set of devices consisting of a memory, a remote clock, a temperature sensor, a digital potentiometer, a digital audio circuit, a security circuit, a digital signal processing circuit, a controller circuit, a storage device, an analog-to-digital converter, a digital-to-analog converter, a memory storing a serial number, and combinations thereof.

14. The circuit in claim 1, wherein:
said controlling the direction of data traffic includes the controlling of input and output data communication;
said controlling of input and output data communication is without the presence of any additional signaling protocol that identifies a data input phase or a data output phase;
said controlling of input and output data communication is conducted without any non-data bit overhead;
said instantaneous source impedance is changed between a low impedance and a high impedance, and a ratio of said high impedance to said low impedance is between at least about 100:1 and about 10000:1;
said first device comprises a microprocessor and said second device comprises a peripheral device coupled with said microprocessor, and said controlling I/O line comprises a controlling microprocessor I/O line.

15. The apparatus in claim 14, wherein said peripheral device comprises a memory.

16. The apparatus in claim 14, wherein said peripheral device is a device selected from the set of devices consisting of a memory, a remote clock, a temperature sensor, a digital potentiometer, a digital audio circuit, a security circuit, a digital signal processing circuit, a controller circuit, a storage device, an analog-to-digital converter, a digital-to-analog converter, a memory storing a serial number, and combinations thereof.

17. An interface circuit for controlling the direction of date traffic, between a processor and a memory coupled to said processor, over only a single I/O line by utilizing the differences of instantaneous source impedance of the controlling I/O line during data out and data in transmission modes.

18. The interface circuit of claim 17, wherein: said controlling of direction of data traffic is without the presence of any additional signaling protocol that identifies a data input phase or a data output phase; and said instantaneous source impedance is changed between a low impedance and a high impedance, and a ratio of said high impedance to said low impedance is between at least about 500:1.

19. The interface circuit of claim 17, wherein
said controlling of direction of data traffic is without the presence of any additional signaling protocol that identifies a data input phase or a data output phase;
said controlling of input and output data communication is conducted without any non-data bit overhead; and said instantaneous source impedance is changed between a low impedance and a high impedance, and a ratio of said high impedance to said low impedance is between at least about 100:1 and about 10000:1.

20. The interface circuit of claim 17, wherein the bidirectional exchange of data occurring over a single microprocessor I/O line on a bit-by-bit basis.

21. The interface circuit of claim 17, wherein the bidirectional exchange of data occurring over a single microprocessor I/O line independent of any signaling protocol.

22. The interface circuit of claim 17, wherein the bidirectional exchange of data occurring over a single I/O line on a bit-by-bit basis is independent of any signaling protocol.

23. The interface circuit of claim 1, wherein the bidirectional exchange of data occurring over a single microprocessor I/O line on a bit-by-bit basis.

24. The interface circuit of claim 1, wherein the bidirectional exchange of data occurring over a single microprocessor I/O line independent of any signaling protocol.

25. The interface circuit of claim 1, wherein the bidirectional exchange of data occurring over a single I/O line on a bit-by-bit basis independent of any signaling protocol.

26. The interface circuit of claim 1, wherein the bidirectional exchange of data occurring over a half-duplex communications line that requires no signaling protocol.

27. The interface circuit of claim 1, wherein the bidirectional exchange of data occurring over a half-duplex communications line that requires no signaling protocol.

28. The interface circuit of claim 17, wherein the bidirectional exchange of data occurring over a half-duplex communications line that requires no signaling protocol.

29. The interface circuit of claim 1, wherein the controlling of the direction of data transmission over a single conductor is accomplished without the need of timing commands.

30. The interface circuit of claim 17, wherein the controlling of the direction of data transmission over a single conductor is accomplished without the need of timing commands.

31. The interface circuit of claim 1, wherein the controlling of the direction of data transmission over a single conductor is accomplished without the need of timing circuits.

32. The interface circuit of claim 17, wherein the controlling of the direction of data transmission over a single conductor is accomplished without the need of timing circuits.

33. The circuit in claim 1, further including means for preventing a peripheral device from receiving a data as an input that is intended as an output to an external circuit.

34. The circuit in claim 33, wherein said external circuit comprises a microprocessor.

35. The circuit in claim 34, wherein said external circuit comprises a host computer or a component thereof.

36. The circuit in claim 1, further comprising data signal and clock signal separation circuit for separation of data-out+clock and data-in at the peripheral device such that it can interface to a standard SPI device.

37. The circuit in claim 17, further comprising data signal and clock signal separation circuit for separation of data-out+clock and data-in at the peripheral device such that it can interface to a standard SPI device.

38. The circuit in claim 1, further comprising a data signal extraction circuit operative to extract a data signal from a composite signal comprising said data signal and another signal.

39. The circuit in claim 38, wherein said another signal comprises a clock signal.

40. The circuit in claim 1, further comprising a clock signal extraction circuit operative to extract a clock signal from a composite signal comprising said clock signal and another signal.

41. The circuit in claim 40, wherein said another signal comprises a data signal.

42. The circuit in claim 1, further comprising a circuit for separation of data-out and data-in at the peripheral device such that it can interface to a standard UART at the peripheral device.

43. The circuit in claim 1, further comprising a circuit for separation of data-out and data-in at the peripheral device such that it can interface to a standard SPI peripheral device.

44. The circuit in claim 1, further comprising a separation circuit for separating an output data signal from an input data signal at said peripheral device.

45. The circuit in claim 1, further comprising separation means for separating an output data signal from an input data signal at said peripheral device.

46. The circuit in claim 1, wherein separation of data out and data in, at the second device, is performed such that it can interface to devices which use Pulse Width Modulation to convey analog values.

\* \* \* \* \*